(12) United States Patent  
Chatterjee et al.

(10) Patent No.: US 7,533,210 B2  
(45) Date of Patent: ***May 12, 2009

(54) VIRTUAL COMMUNICATION INTERFACES FOR A MICRO-CONTROLLER

(75) Inventors: Ranen Chatterjee, Fremont, CA (US); Srinivasa Babu Venkatachalam, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1330 days.

This patent is subject to a terminal disclaimer.

(21) Appl. No.: 10/691,071

(22) Filed: Oct. 21, 2003

(65) Prior Publication Data

US 2004/0083356 A1    Apr. 29, 2004

Related U.S. Application Data

(60) Provisional application No. 60/420,849, filed on Oct. 24, 2002.

(51) Int. Cl.
*G06F 13/00* (2006.01)

(52) U.S. Cl. ................... 710/315; 710/313

(58) Field of Classification Search .......... 719/310, 719/320; 710/8, 9, 10, 306, 313, 315
See application file for complete search history.

(56) References Cited

U.S. PATENT DOCUMENTS

| | | | |
|---|---|---|---|
| 6,501,660 B1 * | 12/2002 | Ho et al. | 361/752 |
| 6,542,939 B1 | 4/2003 | Osten | |
| 6,614,752 B1 | 9/2003 | Parrish et al. | |
| 6,633,835 B1 * | 10/2003 | Moran et al. | 702/190 |
| 6,636,917 B1 * | 10/2003 | Linares et al. | 710/300 |
| 6,681,282 B1 | 1/2004 | Golden | |
| 6,801,904 B2 * | 10/2004 | Chaudhuri et al. | 707/2 |
| 6,845,410 B1 | 1/2005 | Brown | |
| 6,711,693 B1 | 3/2005 | Golden | |
| 6,968,464 B2 * | 11/2005 | Gardiner et al. | 713/300 |
| 2001/0044841 A1 | 11/2001 | Kosugi et al. | |
| 2003/0033464 A1 | 2/2003 | Larson et al. | |
| 2005/0091438 A1 | 4/2005 | Chatterjee | |

OTHER PUBLICATIONS

"The Interactive Performance of SLIM: a Stateless, Thin-Client Architecture", Schmidt, et al, *17th ACM Symposium on Operating System Principles (SOSP '99)*, published as *Operating Systems Review*, ACM, 34(5): 32-47, Dec. 1999.

* cited by examiner

*Primary Examiner*—Van H Nguyen
(74) *Attorney, Agent, or Firm*—Meyertons Hood Kivlin Kowert & Goetzel, P.C.

(57) ABSTRACT

A Compact Peripheral Component Interconnect (CPCI) system is provided that allows an Intelligent Platform Management Interface (IPMI) controller to be virtualized across many interested client entities. The system may include one or more interfaces that are provided by a virtualizing entity to allow a client application to obtain a handle to a virtual micro-controller, interfaces that are provided to reserve exclusive rights on certain IPMI commands on a particular virtual controller, and/or interfaces that are provided to request for a particular type of asynchronous message received on an IPMI micro-controller. In addition, the system may provide a reservation of IPMI sequence numbers over a virtual client and a usage of the IPMI sequence numbers to decide the intended virtual controller. The system may also be used to perform the many independent management tasks.

21 Claims, 6 Drawing Sheets

VIRTUAL COMMUNICATION INTERFACES FOR A MICRO-CONTROLLER

RELATED APPLICATION DATA

This application claims priority pursuant to 35 U.S.C. §119(e) to U.S. Provisional Application No. 60/420,849, filed Oct. 24, 2002, for Virtual Communication Interfaces IPMI.

BACKGROUND OF THE INVENTION

1. Field of the Invention

The present invention relates to computer systems and the like, more particularly, it relates to a system and method for independent system management.

2. Description of Related Art

A computer platform can be designed with a variety of implementations/architectures that are either defined within existing standards (for example the PCI Industrial Computer Manufacturers Group, or PICMG, standards), or can be customized architectures. For example, a computer platform can be designed with a Compact Peripheral Component Interconnect (CPCI). The CPCI is a high performance industrial bus based on the standard PCI electrical specification in rugged 3U or 6U Eurocard packaging. CPCI is intended for application in telecommunications, computer telephony, real-time machine control, industrial automation, real-time data acquisition, instrumentation, military systems or any other application requiring high-speed computing, modular and robust packaging design, and long-term manufacturer support. Because of its high speed and bandwidth, the CPCI bus is particularly well suited for many high-speed data communication applications, such as for server applications.

Compared to a standard desktop PCI, a computer system having CPCI supports twice as many PCI slots (typically 8 versus 4) and offers an ideal packaging scheme for industrial applications. A CPCI computer system includes CPCI node cards that are designed for front loading and removal from a card chassis and a plurality of field replaceable units (FRUs)—such as fans, power supplies, etc. The CPCI node cards (or motherboards or front cards) include processing unit(s) for the computer system and are firmly held in position by their connector, card guides on both sides, and a faceplate that solidly screws into the card rack. The CPCI node cards are mounted vertically allowing for natural or forced air convection for cooling. Also, the pin-and-socket connector of the CPCI node card is significantly more reliable and has better shock and vibration characteristics than the card edge connector of the standard PCI node cards.

The node cards (or CPU blades) have access to an Intelligent Platform Management Interface (IPMI) micro-controller to receive notification of system management events and to participate in the overall management infrastructure. Normally, there is a single client application (e.g., a single system management application or a software module) which communicates with the IPMI micro-controller (as a client of the micro-controller). However, it would be highly beneficial if each of a plurality of client applications (e.g., management applications) running on the CPU has access to the IPMI micro-controller independent of all other applications. For example, it would be beneficial for a plurality of management applications to have simultaneous or concurrent access to the micro-controller. In addition, such access would allow each application to obtain management information (from the micro-controller) independent of all other applications. Accordingly, it would be advantageous to provide a CPCI system having an IPMI micro-controller that can provide independent management, administrative and other services and/or information to a plurality of client applications (e.g., management applications). Moreover, it would be advantageous to provide a system and method that overcomes the problem, or problems, that may be encountered in the distribution of IPMI micro-controller services across many different client applications.

SUMMARY OF THE INVENTION

The present invention relates to a Compact Peripheral Component Interconnect (CPCI) system having an Intelligent Platform Management Interface (IPMI) micro-controller that is adapted to provide services independently (e.g., management information) among a plurality of discrete client applications and/or management applications (separate or unrelated from one another). In one embodiment of the present invention, an IPMI micro-controller is virtualized to service many client or system management applications running on a single central processing unit (CPU). The virtualization allows each application to operate as if it is the sole (or only or single) client communicating with the IPMI micro-controller (or controller) and, pursuant to its design to manage a specific system management function and/or to access a specific device. For example, an event distributor application can receive events from the micro-controller and pass them to other interested clients. A management application (or software entity) can communicate with another CPU by using the IPMI channel (or IPM Bus (IPMB)) to track whether the other CPU is alive or dead. Another application can be responsible for reading serial electrically-erasable, programmable read-only memory (EEPROM) data located on the IPM bus, etc. The present invention provides methods and/or apparatus that specifically address how the micro-controller resources can be virtualized to attend discretely to these various independent client applications (or management software) of the IPMI controller.

In a more specific embodiment, a CPCI system includes a chassis and a circuit board forming a backplane within the chassis. A node card is coupled with the circuit board and has a central processing unit (CPU). The CPU is running a plurality of applications for managing and accessing devices on the CPCI system. An Intelligent Platform Management Interface (IPMI) micro-controller is coupled with the circuit board and in communication with the CPU via an IPMI. The IPMI micro-controller and the CPU include a plurality of virtual controllers. Each of the plurality of applications running on the CPU independently, simultaneously, and/or currently access resources on the IPMI micro-controller via the plurality of virtual controllers.

In another embodiment of the present invention, the CPCI system includes an IPMI micro-controller, a virtualizer agent, and a plurality of virtual controllers coupled with the IPMI micro-controller via the virtualizer agent. The virtualizer agent accepts requests from each of the virtual controllers and forwards the requests to the IPMI micro-controller. The virtualizer agent also accepts information received from the IPMI micro-controller and forwards the information to at least one of the plurality of virtual controllers.

In a further embodiment, the virtualizer agent provides an interface to allow each of the plurality of applications running on the CPU to obtain a handle for a corresponding one of the plurality of virtual controllers, an interface to allow each of the plurality of applications to reserve an exclusive right for an IPMI command on a corresponding one of the plurality of virtual controllers, and/or an interface to allow at least one of said plurality of applications to request an asynchronous message received on the IPMI micro-controller. The plurality of applications running on the CPU can also perform a plurality of independent management tasks without any correlation between the tasks via the plurality of virtual controllers. In addition, at least one of the plurality of applications can reserve an IPMI sequence number. The IPMI sequence number is used to determine at least one of the plurality of virtual controllers intended to serve the at least one application.

A more complete understanding of the system and method for providing virtual communication interfaces for a micro-controller will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

The drawings illustrate the design and utility of preferred embodiments of the invention. The components in the drawings are not necessarily to scale, emphasis instead being placed upon illustrating the principles underlying the embodiment. Moreover, in the drawings like reference numerals designate corresponding parts throughout the different views.

FIG. 4(*a*) shows a front view of another CPCI backplane;

FIG. 4(*b*) shows a back view of the backplane of FIG. 4(*a*);

DETAILED DESCRIPTION

The present invention is directed to methods and/or systems that are adapted to provide virtualized, micro-controller resources. The virtualization allows the various client applications (or management software or modules) to receive the micro-controller resources independently without notice regarding the use of the micro-controller's resources by other client applications.

In one embodiment of the present invention, a system and/or method is provided to virtualize the resources of a single Intelligent Platform Management Interface (IPMI) micro-controller across many independent client applications simultaneously running on the main central processing unit (CPU). The embodiment includes a method to obtain many virtual IPMI micro-controllers on a single operating system image, as well as the primitives used by clients (or client applications) of such virtual micro-controllers. The virtual IPMI micro-controllers are used to avail the services of the actual IPMI micro-controller to the various clients.

Embodiments of the present invention can be implemented with one or more CPU cards (or node cards or CPU blades) that are plugged into a CPCI system (e.g., a Netra® ct system). The CPU cards are managed from the system service processor (SSP). The primary channel of communication between the SSP and the individual node cards is an IPMI link (or IPM bus) via the IPMI micro-controller. The same link is also used for inter-card (or inter-blade) interactions. Multiple client applications running on each node (or CPU) card use Service Management Card (SMC) resources via the IPMI micro-controller to communicate externally (e.g., to the outside world or to communicate with other CPU cards or Field Replaceable Units). To enable these clients (or client applications or management applications) to communicate without conflict, an embodiment of the present invention includes a software module that manages SMC resources and distributes these resources in a non-conflicting manner. Specifically, software running on each card comprises a plurality of functional modules. Each of the functional modules may perform a job not conflicting with another module.

One embodiment of the present invention provides a method and/or system that allows these modules to be greatly simplified because each of these modules may have independent access to the SMC (i.e., unaware of the other modules using the SMC). That is, the design of these modules may be simplified by providing virtual interaction with the SMC. If an interface can be provided in which each client thinks it owns the SMC resources being used, these modules may be designed independently without being apprised of resource allocation to other modules by the SMC. In one embodiment of the present invention, a virtual interface for an SMC has been implemented in the form of a device driver. This device driver provides interface applications which may be used by any client to create a virtual interface with SMC services. The device driver may provide any number of virtual interfaces. In one embodiment, 256 virtual interfaces are made available by the driver. A client of the IPMI micro-controller may utilize any number of available virtual interfaces provided by the driver.

Figure 1:
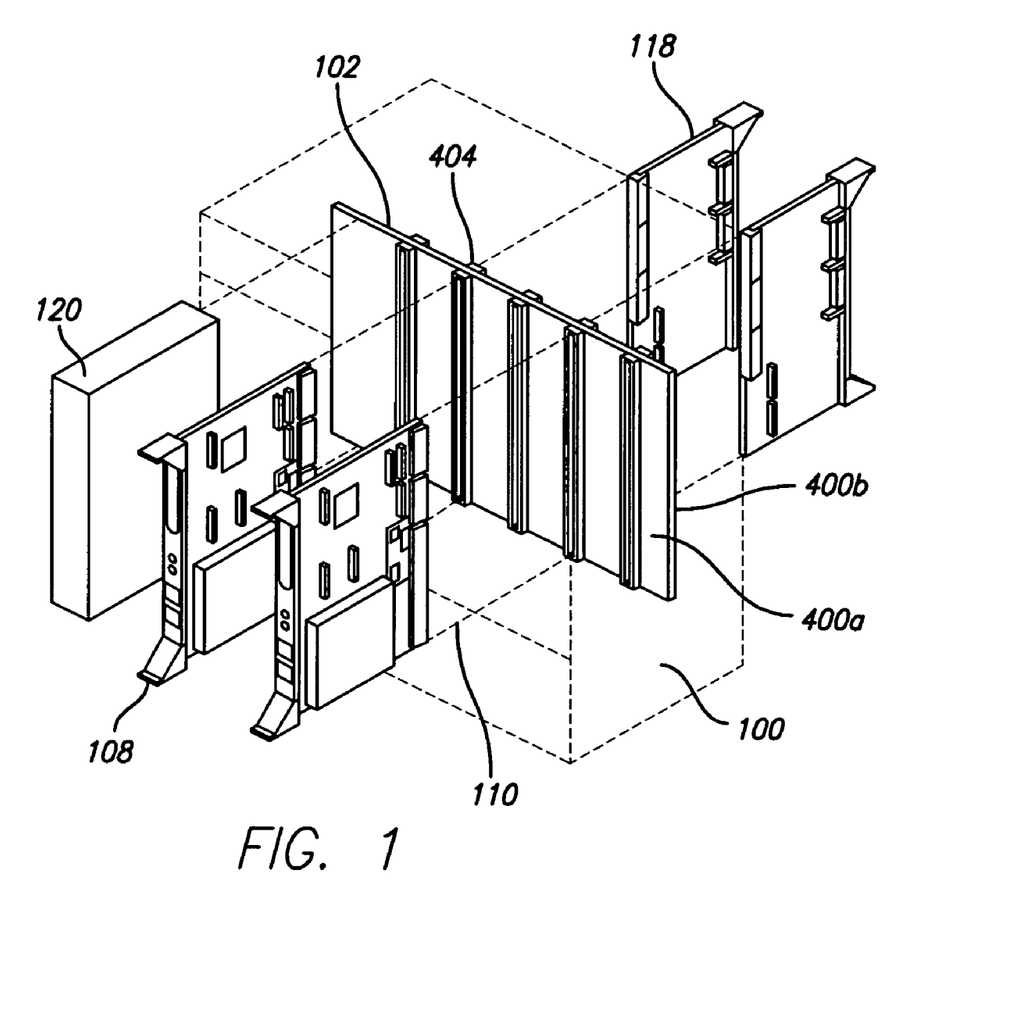
FIG. 1 is an exploded perspective view of a CPCI chassis system according to an embodiment of the invention.

Referring to FIG. 1, there is shown an exploded perspective view of a CPCI chassis system as envisioned in an embodiment of the present invention. The chassis system 100 includes a CPCI circuit board referred to in the conventional CPCI system as a passive backplane (or centerplane) 102 since the circuit board is located at the back of the chassis 100 and front cards (e.g., motherboards) are inserted from the front of the chassis 100. The front side 400*a* of the backplane 102 has slots provided with connectors 404. A corresponding transition card 118 is coupled to the front card 108 via backplane 102. The backplane 102 contains corresponding slots and connectors (not shown) on its backside 400*b* to mate with transition card 118. In the chassis system 100 that is shown, a front card 108 may be inserted into appropriate slots and mated with the connectors 404. For proper insertion of the front card 108 into the slot, card guides 110 are provided. This CPCI chassis system 100 provides front removable front cards (e.g., motherboards) and unobstructed cooling across the entire set of front cards. The backplane 102 is also connected to a power supply 120 that supplies power to the CPCI system.

Figure 2:
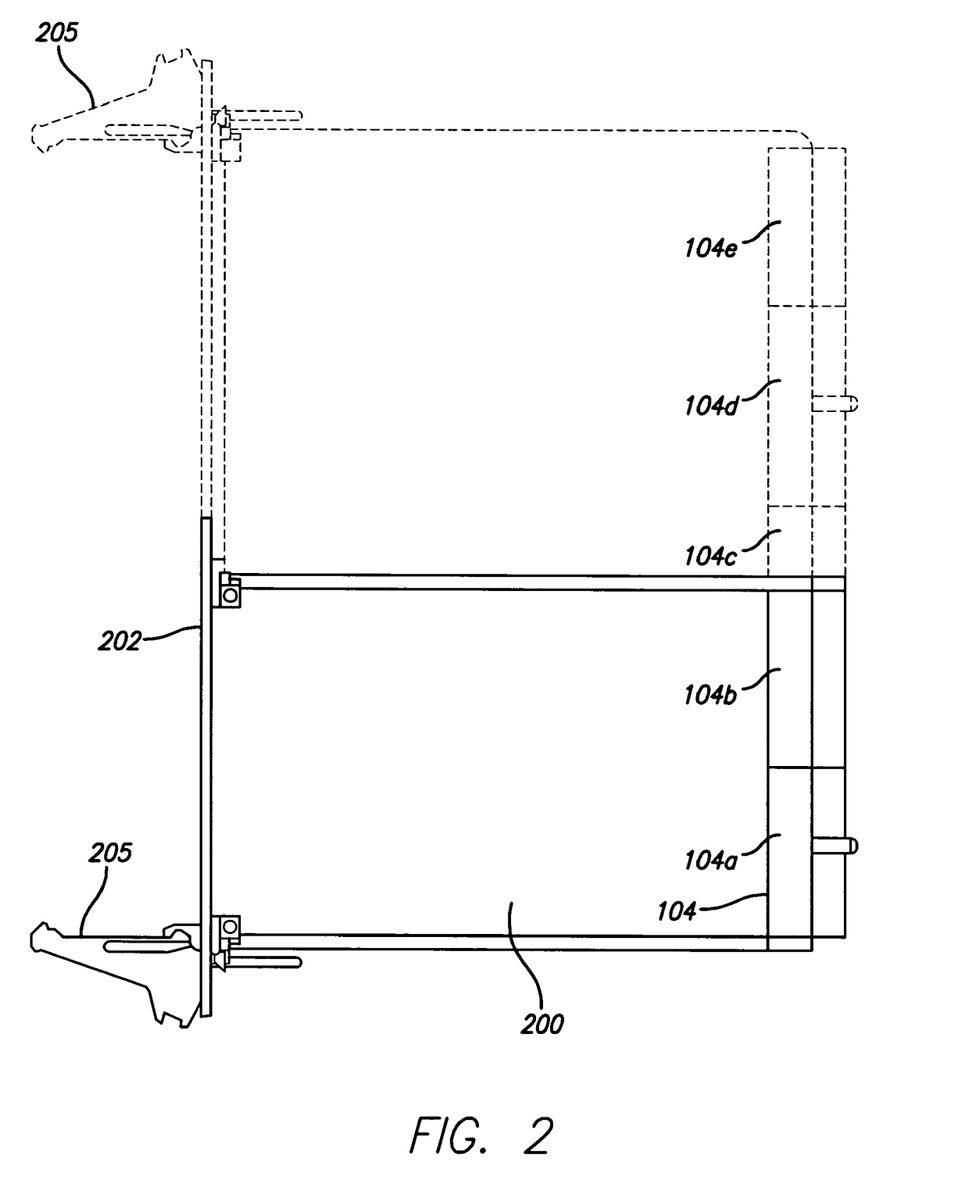
FIG. 2 shows the form factors that are defined for the CPCI node card.

Referring to FIG. 2, there are shown the form factors defined for the CPCI front card (e.g., motherboard), which is based on the PICMG CPCI industry standard (e.g., the standard in the PICMG 2.0 CPCI specification). As shown in FIG. 2, the front card 200 has a front plate interface 202 and ejector/injector handles 205. The front plate interface 202 is consistent with PICMG CPCI packaging and is compliant with IEEE 1101.1 or IEEE 1101.10. The ejector/injector handles should also be compliant with IEEE 1101.1. Two ejector/injector handles 205 are used for the 6U front cards in the present invention. The connectors 104a-104e of the front card 200 are numbered starting from the bottom connector 104a, and the 6U front card size is defined, as described below.

The dimensions of the 3U form factor are approximately 160.00 mm by approximately 100.00 mm, and the dimensions of the 6U form factor are approximately 160.00 mm by approximately 233.35 mm. The 3U form factor includes two 2 mm connectors 104a-104b and is the minimum as it accommodates the full 64 bit CPCI bus. Specifically, the 104a connectors are reserved to carry the signals required to support the 32-bit PCI bus; hence no other signals may be carried in any of the pins of this connector. Optionally, the 104a connectors may have a reserved key area that can be provided with a connector "key," which may be a pluggable piece (e.g., a pluggable plastic piece) that comes in different shapes and sizes, to restrict the add-on card to mate with an appropriately keyed slot. The 104b connectors are defined to facilitate 64-bit transfers or for rear panel I/O in the 3U form factor. The 104c-104e connectors are available for 6U systems as also shown in FIG. 2. The 6U form factor includes the two connectors 104a-104b of the 3U form factor, and three additional 2 mm connectors 104c-104e. In other words, the 3U form factor includes connectors 104a -104b, and the 6U form factor includes connectors 104a-104e. The three additional connectors 104c-104e of the 6U form factor can be used for secondary buses (i.e., Signal Computing System Architecture (SCSA) or MultiVendor Integration Protocol (MVIP) telephony buses), bridges to other buses (i.e., Virtual Machine Environment (VME) or Small Computer System Interface (SCSI)), or for user specific applications. Note that the CPCI specification defines the locations for all of the connectors 104a-104e, but only the signal-pin assignments for certain connectors are defined (e.g., the CPCI bus portion 104a and 104b are defined). The remaining connectors are the subjects of additional specification efforts or can be user defined for specific applications, as described above.

Figure 3:
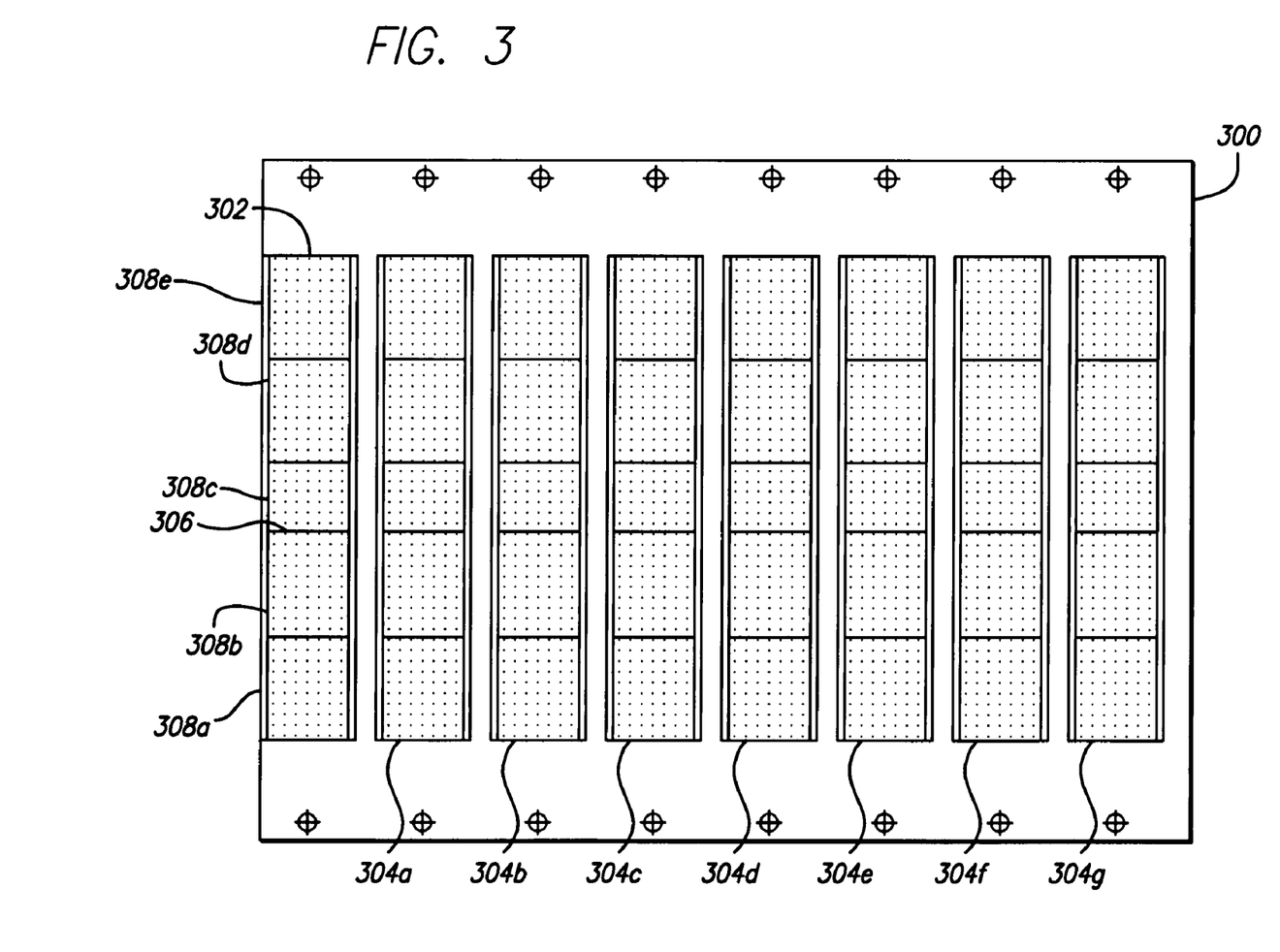
FIG. 3 is a front view of a backplane having eight slots with five connectors each.

Referring to FIG. 3, there is shown a front view of a 6U backplane having eight slots. A CPCI system includes one or more CPCI bus segments, where each bus segment typically includes up to eight CPCI card slots. Each CPCI bus segment includes at least one system slot 302 and up to seven peripheral slots 304a-304d. The CPCI front card for the system slot 302 provides arbitration, clock distribution, and reset functions for the CPCI peripheral cards on the bus segment. The peripheral slots 304a-304d may contain simple cards, intelligent slaves and/or PCI bus masters.

The connectors 308a-308e have connector-pins 306 that project in a direction perpendicular to the backplane 300, and are designed to mate with the front side "active" cards ("front cards"), and "pass-through" its relevant interconnect signals to mate with the rear side "passive" input/output (I/O) card(s) ("rear transition cards"). In other words, in the conventional CPCI system, the connector-pins 306 allow the interconnected signals to pass-through from the front cards, such as the motherboards, to the rear transition cards.

Figure 4A:
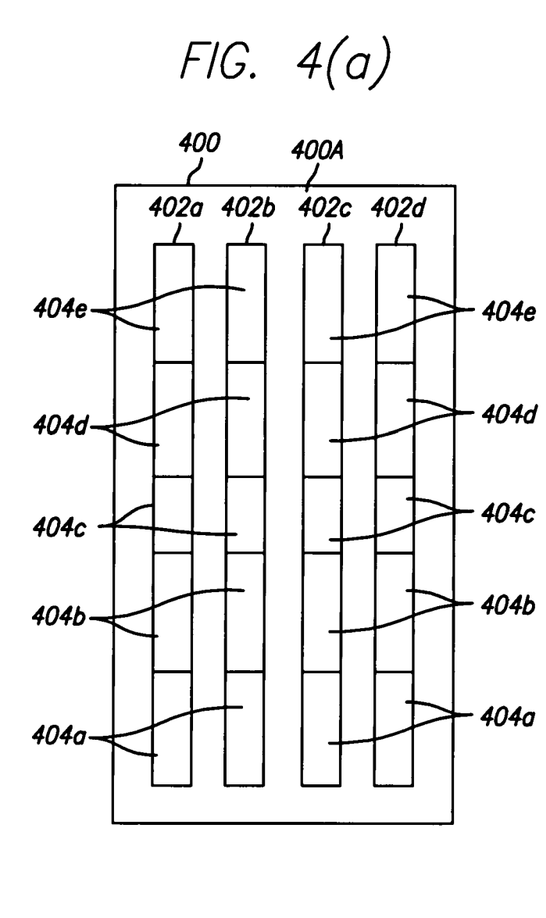
Figure 4B:
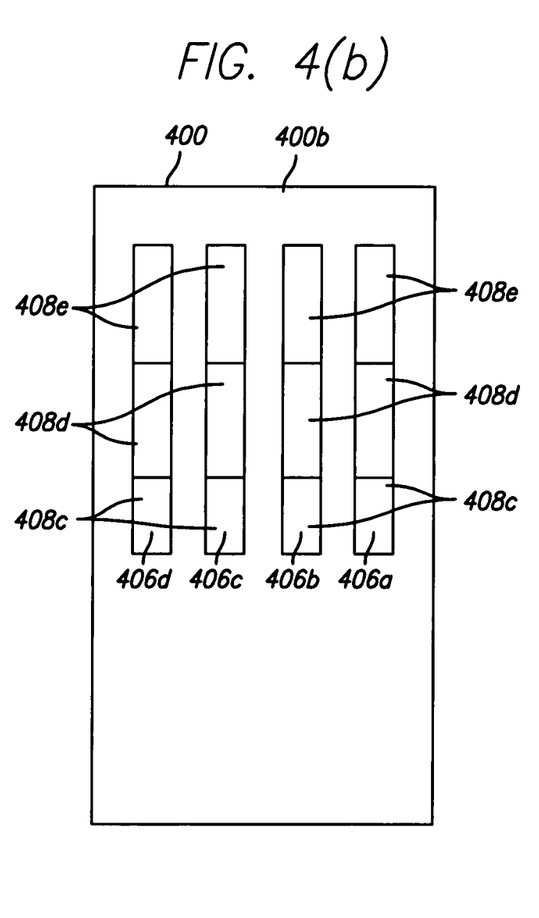

Referring to FIGS. 4(*a*) and 4(*b*), there are shown respectively a front and back view of a CPCI backplane in another 6U form factor embodiment. In FIG. 4(*a*), four slots 402a-402d are provided on the front side 400a of the backplane 400. In FIG. 4(*b*), four slots 406a-406d are provided on the back side 400b of the backplane 400. Note that in both FIGS. 4(*a*) and 4(*b*) four slots are shown instead of eight slots as in FIG. 3. Further, it is important to note that each of the slots 402a-402d on the front side 400a has five connectors 404a-404e while each of the slots 406a-406d on the back side 400b has three connectors 408c-408e. This is because the 404a connectors are provided for 32 bit PCI and connector keying and the 404b connectors are typically only for I/O in the 3U form factor. Thus, in the 6U form factor they do not typically have I/O connectors to their rear. Accordingly, the front cards that are inserted in the front side slots 402a-402d only transmit signals to the rear transition cards that are inserted in the back side slots 406a-406d through front side connectors 404c-404e.

Figure 5:
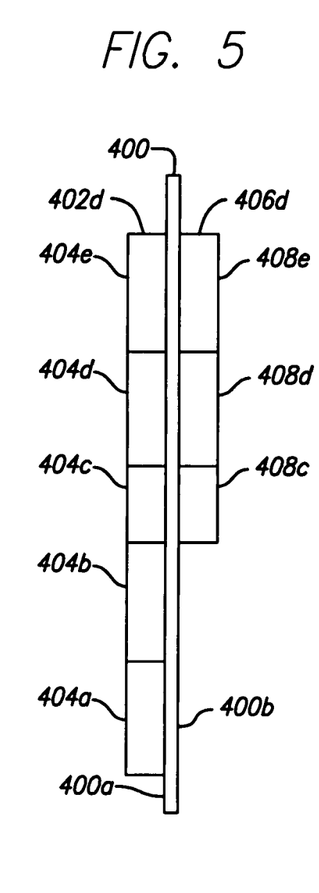
FIG. 5 shows a side view of the backplane of FIGS. 4(*a*) and 4(*b*)

Referring to FIG. 5, there is shown a side view of the backplane of FIGS. 4(*a*) and 4(*b*). As shown in FIG. 5, slot 402d on the front side 400a and slot 406d on the back side 400b are arranged to be substantially aligned so as to be back to back. Further, slot 402c on the front side 400a and slot 406c on the backside 400b are arranged to be substantially aligned, and so on. Accordingly, the front side connectors 404c-404e are arranged back-to-back with the back side connectors 408c-408e. Note that the front side connector 404a-404b does not have a corresponding back side connector. It is important to note that the system slot 402a is adapted to receive the front card having a CPU; the signals from the system slot 402a are then transmitted to corresponding connector-pins of the peripheral slots 402b-402d. Thus, the preferred CPCI system can have expanded I/O functionality by adding peripheral front cards in the peripheral slots 402b-402d.

Figure 6:
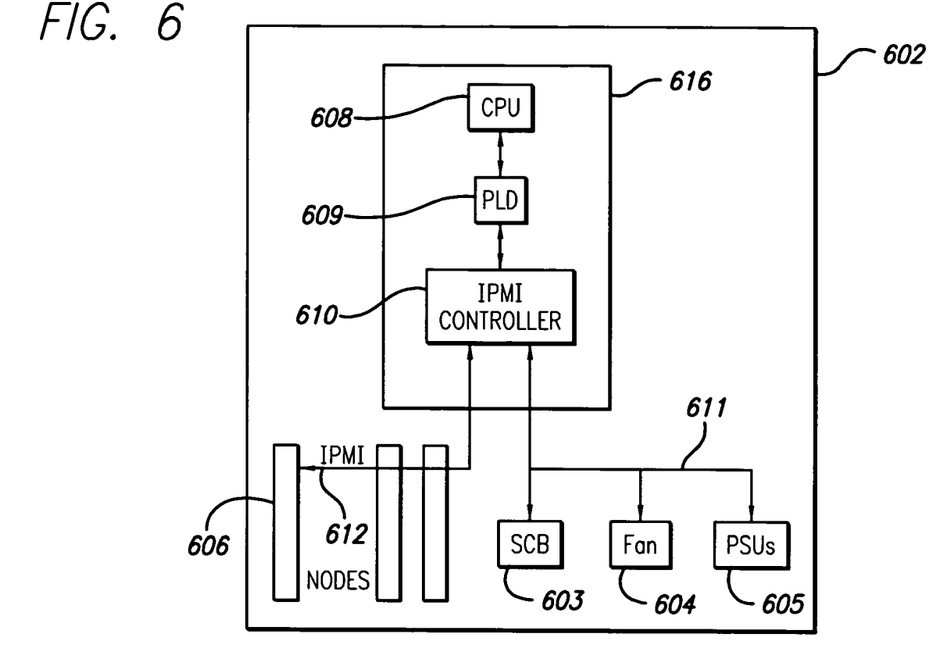
FIG. 6 shows a block diagram that illustrates a CPCI system that includes a system management card.

Referring to FIG. 6, there is shown an exemplary CPCI system 602 comprising a CPCI backplane or midplane (not shown), a plurality of node (or CPU) cards (or blades) 606, a system management card (SMC) 616, a switch card (not shown), power supplies 605, fans 604, and a system control board (SCB) 603. The SMC 616 includes a central processing unit (CPU) 608 of its own to provide the on-board intelligence for the SMC 616 and/or the system. The CPU 608 of the SMC 616 is coupled to memories (not shown) containing firmware and/or software that runs on the SMC, IPMI controller 610, and other devices, such as a programmable logic device (PLD) 609 for interfacing the IPMI controller 610 with the CPU 608. The SCB 603 provides the control and status of the system 602, such as monitoring the healthy status of all the power supplies 5 and the fans 604 (FRUs), powering ON and OFF the FRUs, etc. The SCB 603 is interfaced with the SMC 616 via an Integrated Interconnect Circuit (I2C) bus 611 so that the SMC 616 can access and control the FRUs in the system 602. The fans 604 provide the cooling to the entire system 602. Each of the fans 604 has a fan board which provides control and status information about the fans and, like the SCB 603, are also controlled by the SMC 616 through the I2C bus 611. The power supplies 605 provide the required power for the entire system 602. The SMC 616 manages the power supplies 605 through the I2C 611 (e.g., the SMC 616 determines the status of the power supplies 605 and can power the power supplies 605 ON and OFF). The node cards 606 (like the SMC 616) are independent computing nodes and the SMC 616 manages these node cards 606 though the IPMB 612 (or IPMI).

In addition, the IPMI controller 610 has its own CPU core and runs the IPMI protocol over the IPMB or IPMI 612 to perform the management of the computing node cards 606. IPMI Controller 610 is also the central unit (or point) for the management of the system 602. The CPU 608 of the SMC 616 can control the IPMI controller 610 and retrieve the system 602 status information by interfacing with the IPMI controller 610 via PLD 609. The IPMI controller 610 provides the SMC with the IPMB (or IPMI 612) and the I2C bus 611. The IPMB or (IPMI) 612 connects with the "intelligent FRUs," such as node cards 606 and switch fabric card (not shown) and the I2C 11 connects with the "other FRUs," such as fans 604, power supplies 605, and the SCB 603.

As previously stated, embodiments of the present invention are applicable in a Compact Peripheral Component Interconnect (CPCI) system that is adapted to provide services independently (e.g., management information) to a plurality of discrete clients and/or management applications (separate or unrelated from one another).

As defined in the IPMI specification released from PICMG, each processing unit or CPU (of a node card or motherboard or SMC) has one management application running which communicates with IPMI micro-controller to exchange system management information. One embodiment of the present invention extends this concept to allow the exchange of management information between many independent management applications running simultaneously on the CPU of a node card and the IPMI micro-controller.

Figure 7:
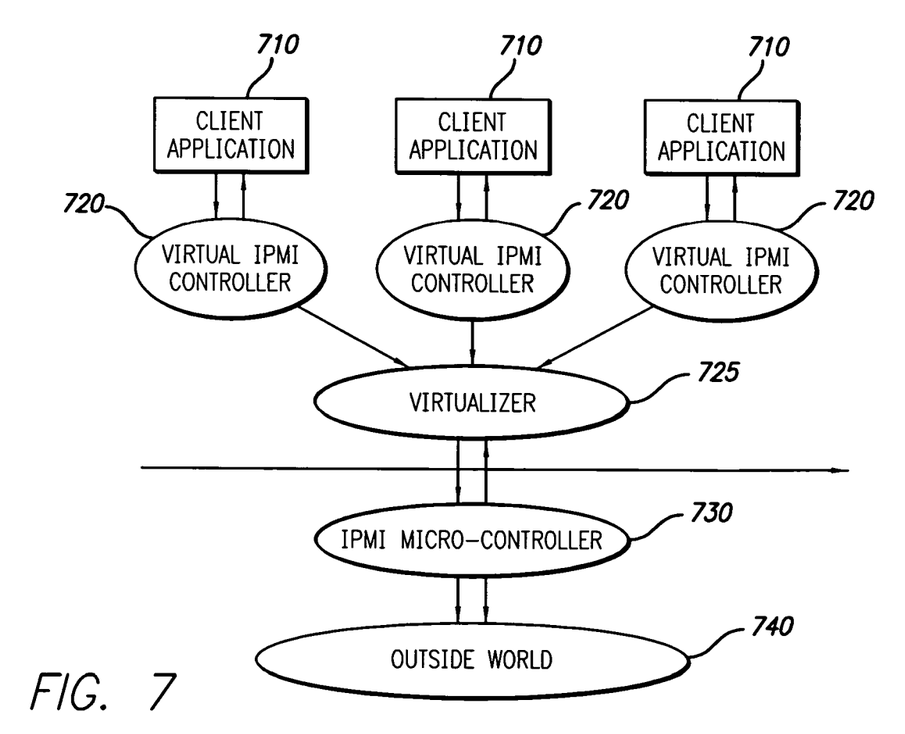
FIG. 7 shows a block diagram on virtualization of an Intelligent Platform Management Bus (IPMB or IPMI) micro-controller or IPMI micro-controller.

In one embodiment of the present invention and referring now to FIG. 7, each client application 710 (e.g., system management application) running on a CPU accesses a virtual IPMI micro-controller 720 and exchanges information with this virtual entity 720. This embodiment may further include a multiplexer/De-multiplexer agent (or a virtualizer) 725 running on the CPU (or processing unit) which accepts requests from each virtual micro-controller and forwards the requests over to the real IPMI micro-controller 730 that interfaces externally with the outside world 740 (e.g., provides the communication paths with other CPU cards via an IPMB or Field Replaceable Units via an I2C bus).

Figure 8:
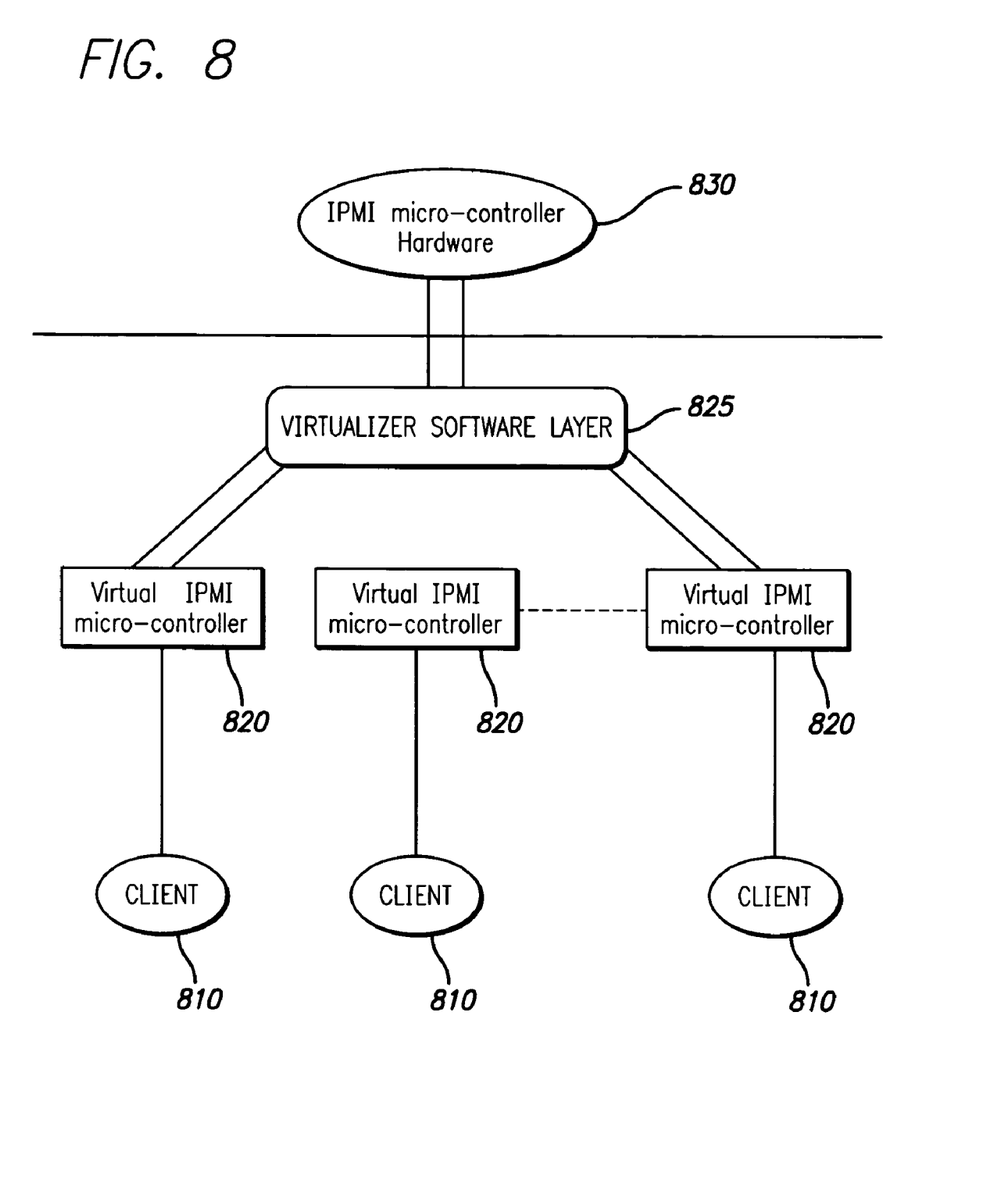
FIG. 8 shows another block diagram on virtualization of an IPMI micro-controller.

Similarly, and referring now to FIG. 8, each of the clients 810 (or client applications or management applications) can register interest in receiving certain management information notification with each of their respective virtual micro-controllers 820. In response, the multiplexer/De-multiplexer of the virtualizer software layer 825 forwards these notifications or information received from the real IPMI micro-controller 830 to all such registered virtual controllers 820.

Accordingly, embodiments of the present invention can provide for flexibility in the design of system management applications which require services from an IPMI controller. For example, software modules (or client applications) can be designed independently; thus, significantly reducing development and maintenance costs. Each of these software modules may operate without concern about resource allocation on micro-controller hardware (e.g., overloading the micro-controller hardware) because such resource management can be undertaken by, for example, a multiplexer/De-multiplexer agent.

In one embodiment of the present invention, the multiplexer/De-multiplexer agent can be implemented as a device driver module on any operating system. Alternatively, it can be a software layer running as a system daemon which communicates directly with actual IPMI micro-controller hardware. In the context of the present invention, this multiplexer/De-multiplexer agent may be referred to as the virtualizer. In one embodiment, the virtualizer of the virtualizer software layer shown in FIGS. 7 and 8 provides a plurality of basic interfaces for usage by a plurality of client applications (e.g., a plurality of system applications).

For example, in accordance to a more specific embodiment of the present invention, the following basic interfaces can be provided by a virtualizer of the present invention for usage by client applications (or client management applications or clients):

(a) Interface to allow a client application to obtain a virtual micro-controller handle. Specifically, a client application may invoke this interface whereby the virtualizer software layer (or the virtualizer) will allocate certain resources to accept requests from client applications communicating with the virtual micro-controller and return responses to those client applications.

(b) Interface to reserve exclusive right to certain micro-controller resources. Specifically, a client application can reserve exclusive access to certain IPMI commands supported by the micro-controller hardware. When such a command is obtained on a specific virtual controller, the same command cannot be issued on another virtual controller. This limitation ensures that two independent system management applications (e.g., 710 or 810) do not try to manage the same shared resources, which can be very destructive.

(c) IPMI specification allows the use of a sequence number field to keep track of request and response messages traveling in an IPMB or IPM bus. When a message is sent from a CPU via an IPMI controller to another IPMI micro-controller (e.g., a destination micro-controller on another node card), a sequence number is provided. Once the destination micro-controller sends a response to the request, it copies the sequence number specified in request message onto the response message as well, allowing the requester to match a given request/response pair. One embodiment of the present invention extends the usage of this sequence number to distinguish between different client applications and to return responses to each of them. Accordingly, an interface is provided on each virtual micro-controller to allow each client application to request for a set of IPMI sequence numbers for communicating with a given destination micro-controller.

In another embodiment of the present invention, a client application specifies the address (IPMI address as defined in the IPMI specifications) and number of sequence numbers requested. The virtualizer software layer (or virtualizer) allocates the number of requested sequence numbers for the intended destination which are currently available and returns them to the client application. The virtualizer also registers the information that these sequence numbers are reserved for the particular virtual controller interface on which the client application had made the request. Next, the client application may send request messages to another IPMI microcontroller (on another node card) using any of these sequence numbers. When a response is received on the actual (designated) micro-controller hardware of the client application, the virtualizer software layer (or virtualizer) matches the sequence number present in the response message to those already registered. Once the matches have been made, the virtualizer is able to determine which virtual interface has been granted this sequence number and forwards that response to that particular virtual controller. The client application then obtains the information from the virtual controller. This allows many management clients to communicate independently with other IPMI micro-controllers, or other CPUs connected with another IPMI micro-controller.

(d) Interface to request that certain asynchronous events and notifications be forwarded to a virtual controller when such an event is received on the actual micro-controller. Many client applications on separate virtual controllers may thus receive the same event independently of one another. One specific usage of this interface is to allow the receipt of IPMI request messages. This is particularly helpful when two CPUs are communicating with each other through their respective IPMI controllers connected through the IPMI or IPMB (or IPM bus). Moreover, two applications running on each of the CPUs may establish peer-to-peer communications using an IPM bus (or IPMI). Thus, each of these applications reserves a set of sequence numbers on their respective virtual interfaces, as well as requests received asynchronous IPMI messages that are received on the micro-controller message queue. Periodically, the virtualizer (having a receiver buffer in accordance to an embodiment of the present invention) empties the contents of the receive buffer and forwards the messages to all virtual controllers from which asynchronous IPMI messages were requested. The interested client application looks at the message and determines whether there is any interest in it. If interested in the received message, the client application responds by copying the sequence number field. Upon receipt of the response, it is delivered to the appropriate virtual controller via the mechanisms described above in part (c).

In general, and according to the foregoing, it should be apparent to those skilled in the art that embodiments of the present invention provide a virtual interface to an IPMI micro-controller that enables a very modular approach to a variety of system management tasks. In particular, these embodiments enable a large number of tasks which otherwise would not have been considered. For example, certain embodiments of the present inventions allow:

(1) Heart-beating between two CPUs by exchange of messages over the IPM bus.
(2) Exchange of compact PCI hotswap related management information between the CPU who owns the PCI bus resources and the service processor CPU which owns the hotswap signals and circuitry.
(3) Regular IPMI system management tasks, e.g. monitoring of sensors, etc.
(4) Access to FRU Identification information from electrically erasable memory devices located on IPM bus or accessible through IPM bus.

For example, in an embodiment of the present invention, a CPCI system includes an IPMI controller that can be virtualized across many interested client entities. An embodiment can also include interfaces provided by a virtualizing entity to allow a client to obtain a handle to a virtual micro-controller interface, interfaces to reserve exclusive rights on certain IPMI commands on a particular virtual controller, and/or interfaces to request for a particular type of asynchronous messages received on the IPMI micro-controller. In addition, an embodiment of the present invention can provide for reservation of IPMI sequence numbers over a virtual client and usage of the IPMI sequence numbers to decide the intended virtual controller and/or for performing many independent management tasks without any explicit correlation between them while using the resources of a single IPMI micro-controller.

Having thus described embodiments of the present invention, it should be apparent to those skilled in the art that certain advantages of the described system have been achieved. It should also be appreciated that various modifications, adaptations, and alternative embodiments thereof may be made within the scope and spirit of the present invention. For example, a system comprising a CPCI system has been illustrated, but it should be apparent that the inventive concepts described above would be equally applicable to other types of card arrangements, buses, motherboards, and computer systems. The invention is further defined by the following claims.

What is claimed:

1. A compact peripheral component interconnect (CPCI) system, comprising:
    a chassis;
    a circuit board forming a backplane within said chassis;
    a node card coupled with said circuit board and having a central processing unit (CPU), said CPU running a plurality of applications for managing and accessing devices on said CPCI system;
    an Intelligent Platform Management Interface (IPMI);
    an IPMI micro-controller coupled with said circuit board and in communication with said CPU via said IPMI;
    wherein said IPMI micro-controller and said CPU comprise a plurality of virtual controllers; and wherein each of said plurality of applications running on said CPU can independently access resources on said IPMI micro-controller via said plurality of virtual controllers.

2. The CPCI system of claim 1, wherein each of said plurality of virtual controllers is coupled with a corresponding one of said plurality of applications for managing and accessing said devices on said CPCI system.

3. The CPCI system of claim 1, wherein each of said plurality of applications running on said CPU can simultaneously access said resources on said IPMI micro-controller via said plurality of virtual controllers.

4. The CPCI system of claim 1, wherein each of said plurality of applications running on said CPU can currently access said resources on said IPMI micro-controller via said plurality of virtual controllers.

5. The CPCI system of claim 1, wherein said plurality of virtual controllers comprise at least 256 virtual controllers for interfacing with at least 256 applications for managing and accessing said devices on said CPCI system.

6. The CPCI system of claim 1, wherein said plurality of applications comprises a plurality of clients of said IPMI micro-controller.

7. The CPCI system of claim 6, wherein said plurality of virtual controllers provide an interface to allow at least one of said plurality of clients to obtain a handle to at least one of said plurality of virtual controllers.

8. The CPCI system of claim 6, wherein said plurality of virtual controllers provide an interface for at least one of said plurality of clients to reserve exclusive rights to certain IPMI commands on at least one of said plurality of virtual controllers.

9. The CPCI system of claim 6, wherein said plurality of virtual controllers provides an interface for at least one of said plurality of clients to request an asynchronous message received on said IPMI micro-controller.

10. The CPCI system of claim 6, wherein at least one of said plurality of clients comprises a plurality of virtual clients of said plurality of virtual controllers, wherein at least one of said plurality of virtual clients can reserve a sequence number, and wherein said sequence number is used to decide at least one of said virtual controllers intended for said at least one client.

11. The CPCI system of claim 1, wherein each of said plurality of applications running on said CPU can perform a plurality of independent management tasks without any correlation with each other via said plurality of virtual controllers.

12. A compact peripheral component interconnect (CPCI) system, comprising:
    a chassis;
    a circuit board forming a backplane within said chassis;
    a node card coupled with said circuit board and having a central processing unit (CPU), said CPU running a plurality of applications for managing and accessing devices on said CPCI system;
    an Intelligent Platform Management Interface (IPMI);
    an IPMI micro-controller coupled with said circuit board and in communication with said CPU via said IPMI;

a virtualizer agent; and a plurality of virtual controllers coupled with said IPMI micro-controller via said virtualizer agent;

wherein said virtualizer agent accepts requests from each of said virtual controllers and forwards said requests to said IPMI micro-controller;

wherein said virtualizer further accepts information received from said IPMI micro-controller and forwards said information to at least one of said plurality of virtual controllers; and wherein each of said plurality of applications is independently coupled to said IPMI micro-controller via said plurality of virtual controllers.

13. The CPCI system of claim 12, wherein said virtualizer agent comprises a multiplexer.

14. The CPCI system of claim 12, wherein said virtualizer agent comprises a de-multiplexer.

15. The CPCI system of claim 12, wherein said virtualizer agent comprises a multiplexer and de-multiplexer agent.

16. The CPCI system of claim 15, wherein said multiplexer and de-multiplexer agent comprise a device driver module of an operating system running on said CPU.

17. The CPCI system of claim 15, wherein said multiplexer and de-multiplexer agent comprise a device daemon that communicates directly with said IPMI micro-controller.

18. The CPCI system of claim 12, wherein said virtualizer agent provides a plurality of interfaces for usage by said plurality of applications and wherein said plurality of interfaces comprise one of an interface to allow at least one of said plurality of applications to obtain a handle to at least one of said plurality of virtual controllers, an interface to allow at least one of said plurality of applications to reserve exclusive rights for an IPMI command on at least one of said plurality of virtual controllers, and an interface to allow at least one of said plurality of applications to request an asynchronous message received on said IMPI micro-controller.

19. The CPCI system of claim 12, wherein each of said plurality of applications running on said CPU can perform a plurality of independent management tasks without any correlation between said management tasks via said plurality of virtual controllers.

20. The CPCI system of claim 12, wherein at least one of said plurality of applications can reserve an IPMI sequence number and wherein said IPMI sequence number is used to determined at least one of said plurality of virtual controllers intended to serve said at least one application.

21. A compact peripheral component interconnect (CPCI) system, comprising:

a chassis;

a circuit board forming a backplane within said chassis;

a node card coupled with said circuit board and having a central processing unit (CPU), said CPU running a plurality of applications for managing and accessing devices on said CPCI system;

an Intelligent Platform Management Interface (IPMI);

an IPMI micro-controller coupled with said circuit board and communicating with said CPU via said IPMI;

a virtualizer agent; and a plurality of virtual controllers coupled with said IPMI micro-controller via said virtualizer agent;

wherein said virtualizer agent provides an interface to allow each of said plurality of applications to obtain a handle to a corresponding one of said plurality of virtual controllers, an interface to allow each of said plurality of applications to reserve an exclusive right for an IPMI command on a corresponding one of said plurality of virtual controllers, and an interface to allow at least one of said plurality of applications to request an asynchronous message received on said IPMI micro-controller;

wherein each of said plurality of applications running on said CPU can perform a plurality of independent management tasks without any correlation between said management tasks via said plurality of virtual controllers; and wherein at least one of said plurality of applications can reserve an IPMI sequence number and wherein said IPMI sequence number is used to determined at least one of said plurality of virtual controllers intended to serve said at least one application.

* * * * *